(12) United States Patent
Fukushima

(10) Patent No.: US 10,700,573 B2
(45) Date of Patent: Jun. 30, 2020

(54) MOTOR DEVICE

(71) Applicant: FANUC CORPORATION, Yamanashi (JP)

(72) Inventor: Yuusuke Fukushima, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 170 days.

(21) Appl. No.: 16/115,700

(22) Filed: Aug. 29, 2018

(65) Prior Publication Data

US 2019/0123614 A1   Apr. 25, 2019

(30) Foreign Application Priority Data

Oct. 20, 2017   (JP) .................. 2017-203823

(51) Int. Cl.
| | | |
|---|---|---|
| *H02K 5/00* | (2006.01) | |
| *H02K 5/24* | (2006.01) | |
| *H02K 11/20* | (2016.01) | |
| *F16F 15/04* | (2006.01) | |
| *G01L 5/24* | (2006.01) | |

(52) U.S. Cl.
CPC .............. *H02K 5/24* (2013.01); *F16F 15/04* (2013.01); *G01L 5/24* (2013.01); *H02K 5/00* (2013.01); *H02K 11/20* (2016.01)

(58) Field of Classification Search
CPC . H02K 5/00; H02K 5/24; H02K 11/20; G01L 5/24
See application file for complete search history.

(56) References Cited

U.S. PATENT DOCUMENTS

| 2019/0242779 A1* | 8/2019 | Sun ................... G01M 13/00 |
|---|---|---|
| 2020/0018673 A1* | 1/2020 | Sun ................... G01M 13/00 |

FOREIGN PATENT DOCUMENTS

| JP | S50-004782 U | 1/1975 |
|---|---|---|
| JP | S58-163843 U | 10/1983 |
| JP | H04-347391 A | 12/1992 |
| JP | H05-052684 A | 3/1993 |
| JP | H06-241927 A | 9/1994 |
| JP | H09-257562 A | 10/1997 |
| JP | H11-287294 A | 10/1999 |
| JP | 2002-147174 A | 5/2002 |
| JP | 2016-188769 A | 11/2016 |

OTHER PUBLICATIONS

An Office Action mailed by the Japanese Patent Office dated Oct. 8, 2019, which corresponds to Japanese Patent Application No. 2017-203823 and is related to U.S. Appl. No. 16/115,700; with English language translation.

(Continued)

*Primary Examiner* — Dang D Le

(74) *Attorney, Agent, or Firm* — Studebaker & Brackett PC

(57) ABSTRACT

A motor device includes: a motor which includes a fixing portion for fixing to a fixing surface with a bolt; a looseness detection sensor which is provided in the fixing portion so as to be adjacent to at least one of the bolts; and a control unit which detects the occurrence of looseness of at least one of the bolts based on a signal output from the looseness detection sensor, and the looseness detection sensor may be formed with any one of a microswitch, a pressure sensor, a vibration sensor and a strain gauge.

2 Claims, 4 Drawing Sheets

(56) References Cited

OTHER PUBLICATIONS

Decision to Grant a Patent issued in JP 2017-203823 and is related to U.S. Appl. No. 16/115,700; mailed by the Japanese Patent Office dated Feb. 12, 2020.
An Office Action; "Notice of Reasons for Refusal," issued by the Japanese Patent Office dated Jun. 11, 2019, which corresponds to Japanese Patent Application No. 2017-203823 and is related to U.S. Appl. No. 16/115,700; with English language translation.

* cited by examiner

MOTOR DEVICE

This application is based on and claims the benefit of priority from Japanese Patent Application No. 2017-203823, filed on 20 Oct. 2017, the content of which is incorporated herein by reference.

BACKGROUND OF THE INVENTION

Field of the Invention

The present invention relates to a motor device which can detect the occurrence of looseness of a bolt that is used for attaching a motor.

Related Art

In industrial devices such as a machine tool and a robot, motors for driving individual drive units are used. In general, a motor is fixed through a fixing portion (a foot portion or a flange portion of the motor) with a bolt to a fixing surface of a machine tool, a robot or the like.

The bolt needs to be fastened without looseness and securely so that the motor is prevented from generating a vibration or the like on the fixing surface, and the fastened state needs to be maintained. However, looseness of the bolt may occur due to repeated torque generated by the drive of the motor, a vibration from the side of a machine such as a machine tool or a robot or the like.

Patent document 1 discloses that an elastic member fixed to a motor is joined to a bracket fixed to a frame so as to prevent the vibration of the motor. However, this technology is not a technology which focuses on the problem on the looseness of a bolt.

Patent Document 1: Japanese Unexamined Patent Application, Publication No. H11-287294

SUMMARY OF THE INVENTION

When looseness of a bolt which fixes a motor occurs, a displacement or a rattle is gradually produced in the attached state of the motor, and thus it is disadvantageously difficult to efficiently transmit the rotation torque of an output shaft. Hence, as a measure, a bolt is coated with an anti-loose agent but it is difficult to completely prevent the looseness of the bolt due to a variation in the applied amount and the like.

However, even if looseness of a bolt occurs, when the looseness of the bolt is found in an early stage before a large displacement or a large rattle is produced in the attached state of the motor, and at that time, it is possible to take measures such as further tightening of the bolt and replacement of the bolt, it is possible to solve the problem in which it is difficult to efficiently transmit the rotation torque of an output shaft.

Hence, an object of the present invention is to provide a motor device which can detect the looseness of a bolt that attaches a motor.

(1) A motor device (for example, a motor device 1 which will be described later) according to the present invention includes: a motor (for example, a motor 2 which will be described later) which includes a fixing portion (for example, a fixing portion 23 which will be described later) for fixing to a fixing surface (for example, a fixing surface 6 which will be described later) with a bolt (for example, a bolt 24 which will be described later); a looseness detection sensor (for example, a looseness detection sensor 3 which will be described later) which is provided in the fixing portion so as to be adjacent to at least one of the bolts; and a control unit (for example, a control unit 4 which will be described later) which detects the occurrence of looseness of at least one of the bolts based on a signal output from the looseness detection sensor.

(2) Preferably in the motor device according to (1), the looseness detection sensor is formed with a microswitch (for example, a microswitch 31 which will be described later), and detects that the fixing portion is separated from the fixing surface by the occurrence of looseness of at least one of the bolts so as to output the signal.

(3) Preferably in the motor device according to (1), the looseness detection sensor is formed with a pressure sensor (for example, a pressure sensor 32 which will be described later), and detects a variation in the axial force of the bolt caused by the occurrence of looseness of at least one of the bolts so as to output the signal.

(4) Preferably in the motor device according to (1), the looseness detection sensor is formed with a vibration sensor (for example, a vibration sensor 33 which will be described later), and detects a vibration of the fixing portion caused by the occurrence of looseness of at least one of the bolts so as to output the signal.

(5) Preferably in the motor device according to (1), the looseness detection sensor is formed with a strain gauge (for example, a strain gauge 34 which will be described later), and detects a variation in the strain of the fixing portion caused by the occurrence of looseness of at least one of the bolts so as to output the signal.

According to the present invention, it is possible to provide a motor device which can detect the looseness of a bolt that attaches a motor.

DETAILED DESCRIPTION OF THE INVENTION

Figure 1:
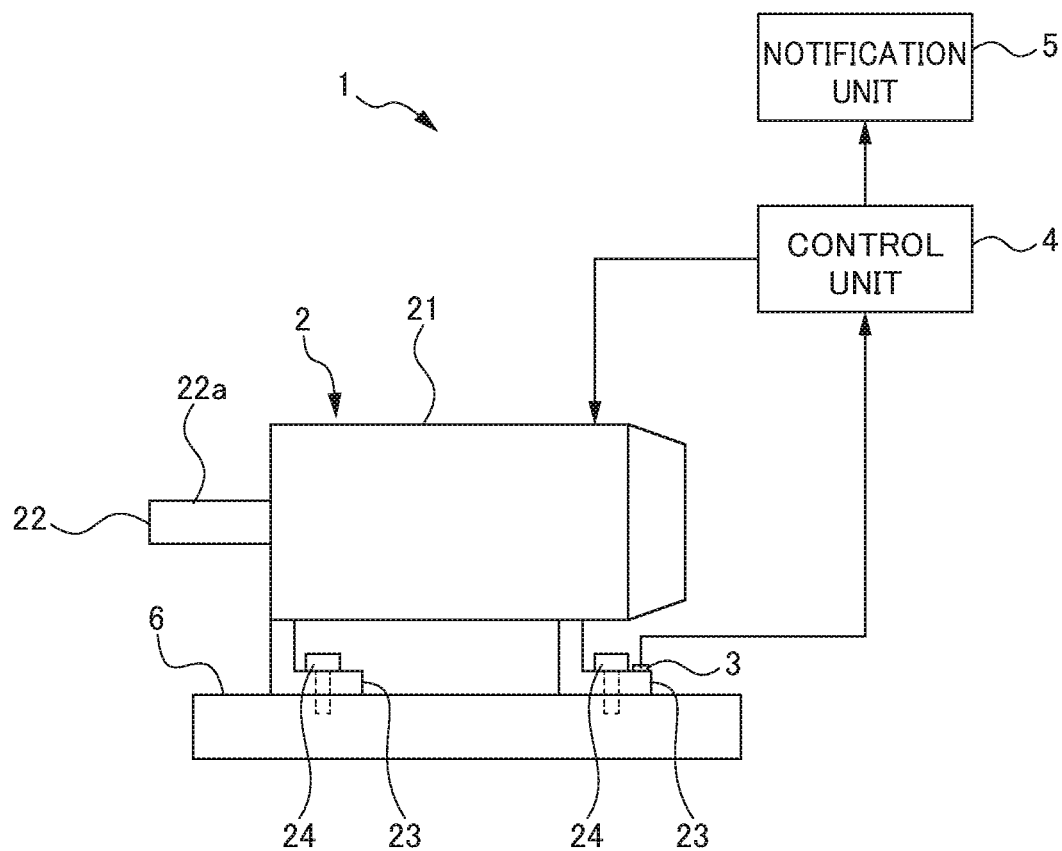
FIG. 1 is a schematic configuration view of a motor device according to an embodiment of the present invention.
Figure 2:
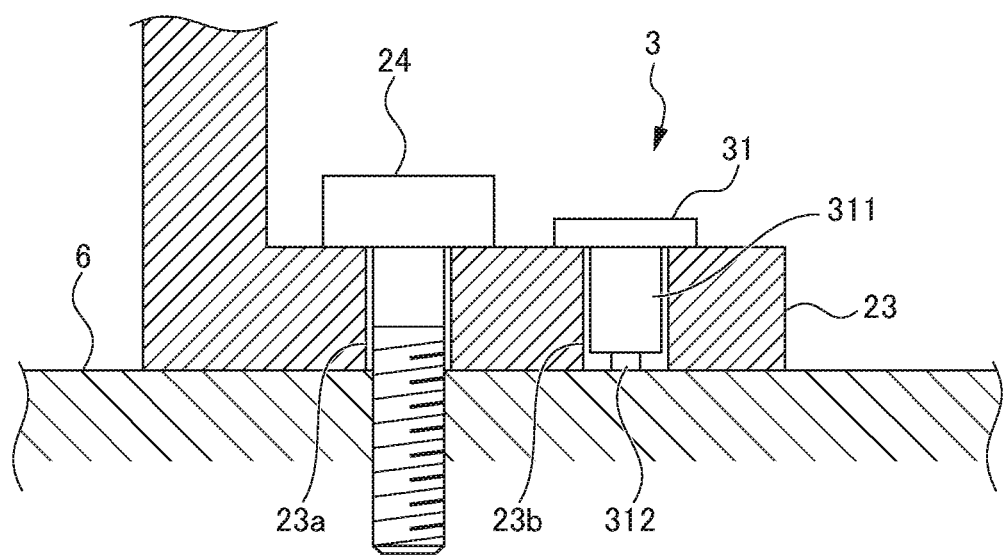
FIG. 2 is an enlarged cross-sectional view showing an example of a fixing portion in a motor shown in FIG. 1.
Figure 3:
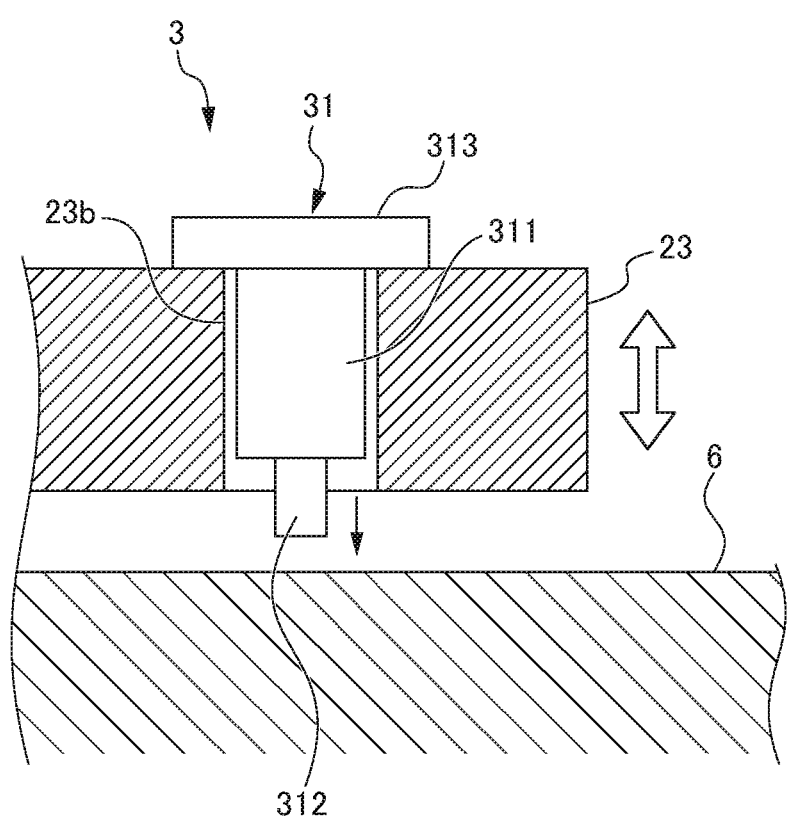
FIG. 3 is a diagram illustrating how looseness of a bolt in the fixing portion shown in FIG. 2 is detected.

An embodiment of the present invention will be described below with reference to drawings. FIG. 1 is a schematic configuration view of a motor device according to the embodiment of the present invention, FIG. 2 is an enlarged cross-sectional view showing an example of a fixing portion in a motor shown in FIG. 1 and FIG. 3 is a diagram illustrating how looseness of a bolt in the fixing portion shown in FIG. 2 is detected. The motor device 1 mainly includes a motor 2, a looseness detection sensor 3, a control unit 4 and a notification unit 5.

The motor 2 supports a rotor in the inside of an unillustrated stator arranged within a housing 21 such that the rotor can be rotated. The rotor includes a rotary axis 22. An end portion 22a of the rotary axis 22 on the side of an output shaft (the left side in FIG. 1) is protruded from the housing 21 of the motor 2. The end portion 22a of the rotary axis 22 is coupled to, for example, the side of an unillustrated machine such as a machine tool or a robot.

The motor 2 includes a plurality of fixing portions 23. Each of the fixing portions 23 is formed with a foot portion which is protruded in the shape of a letter L from the lower surface of the motor 2, and includes at least one bolt through hole 23a. The motor 2 is tightly fixed to a fixing surface 6 with a bolt 24 which is inserted through the bolt through hole 23a of the fixing portion 23. The fixing surface 6 is a surface which is provided on the side of the machine and to which the motor 2 is attached.

The looseness detection sensor 3 is provided in one (the fixing portion 23 on the right side of FIG. 1) of the fixing portions 23 in the motor 2. The looseness detection sensor 3 shown in FIGS. 1 to 3 is formed with a microswitch 31 which indirectly detects the looseness of the bolt 24 in the fixing portion 23.

The microswitch 31 is attached to a through hole 23b which is provided in the fixing portion 23. The through hole 23b is arranged adjacent to the bolt 24. As shown in FIG. 3, the microswitch 31 includes a case 311, an actuator 312 which is protruded from a lower end of the case 311 and a flange 313 which is provided on an upper end portion of the case 311. The microswitch 31 is fixed with the flange 313 to a circumferential edge portion of the through hole 23b. As shown in FIG. 2, in a state where the fixing portion 23 is tightly and properly fixed to the fixing surface 6 by the fastening of the bolt 24, a tip of the actuator 312 is brought into contact with the fixing surface 6 and is slightly pushed into the case 311.

The microswitch 31 is formed such that the microswitch 31 detects that the fixing portion 23 is separated from the fixing surface 6 so as to output a signal. Specifically, when looseness of the bolt 24 occurs, for example, as shown in FIG. 3, by repeated torque of the motor 2, a vibration from the side of the machine or the like, the position of the fixing portion 23 is varied so as to be slightly separated (floated up) from the fixing surface 6. Here, the actuator 312 of the microswitch 31 is elongated as the fixing portion 23 is floated up so as to protrude toward the fixing surface 6 from a proper state shown in FIG. 2. By the elongation of the actuator 312, the microswitch 31 outputs an on-signal to the control unit 4. Although the floating up of the fixing portion 23 detected by the microswitch 31 is an extremely small movement, in FIG. 3, for ease of understanding of description, the floating up of the fixing portion 23 is shown so as to be exaggerated.

The control unit 4 detects the occurrence of looseness of the bolt 24 based on the signal output from the microswitch 31. Specifically, when the fixing portion 23 is slightly floated up from the fixing surface 6 such that the on-signal is output from the microswitch 31, the control unit 4 determines that the looseness of the bolt 24 occurs. When the control unit 4 determines that the looseness of the bolt 24 occurs, the control unit 4 outputs the signal to the notification unit 5 and simultaneously stops the driven rotation of the motor 2.

The control unit 4 may be arranged within the motor 2 such as the housing 21 or may be arranged outside the motor 2. The control unit 4 may be arranged on the side of the machine such as a machine tool or a robot in which the motor 2 is installed. In such a case, the control unit 4 may also be used as a control unit which performs control on the side of the machine.

The notification unit 5 receives the output of the signal from the control unit 4 so as to notify an operator of the occurrence of looseness of the bolt 24. Examples of a specific notification means include a warning display on a monitor screen, the flashing of a warning lamp and the emission of a warning sound.

The notification unit 5 may be arranged within the motor 2 such as the housing 21 or may be arranged outside the motor 2. The notification unit 5 may be arranged on the side of the machine such as a machine tool or a robot in which the motor 2 is installed. In such a case, the notification unit 5 may also be used as a notification unit which performs various types of notification on the side of the machine.

In the motor device 1, when the looseness of the bolt 24 which attaches the motor 2 occurs, it is possible to detect the occurrence of the looseness before such a large displacement or a large rattle as to make it difficult to efficiently transmit the rotation torque of the output shaft is produced in the attached state of the motor 2. When the operator confirms the looseness of the bolt 24, the operator can take measures such as further tightening of the bolt 24 and replacement of the bolt 24, and thus it is possible to remove the problem in the attached state of the motor 2 in an early stage.

Although in the above description, when the microswitch 31 outputs the on-signal, the control unit 4 detects the occurrence of looseness of the bolt 24, the control unit 4 may detect the occurrence of looseness of the bolt 24 when the microswitch 31 outputs an off-signal.

There is no limitation to the configuration in which the microswitch 31 is provided in the through hole 23b. For example, a configuration may be adopted in which an unillustrated concave portion is provided in the lower surface of the fixing portion 23 and in which the microswitch 31 is provided within the concave portion.

Figure 4:
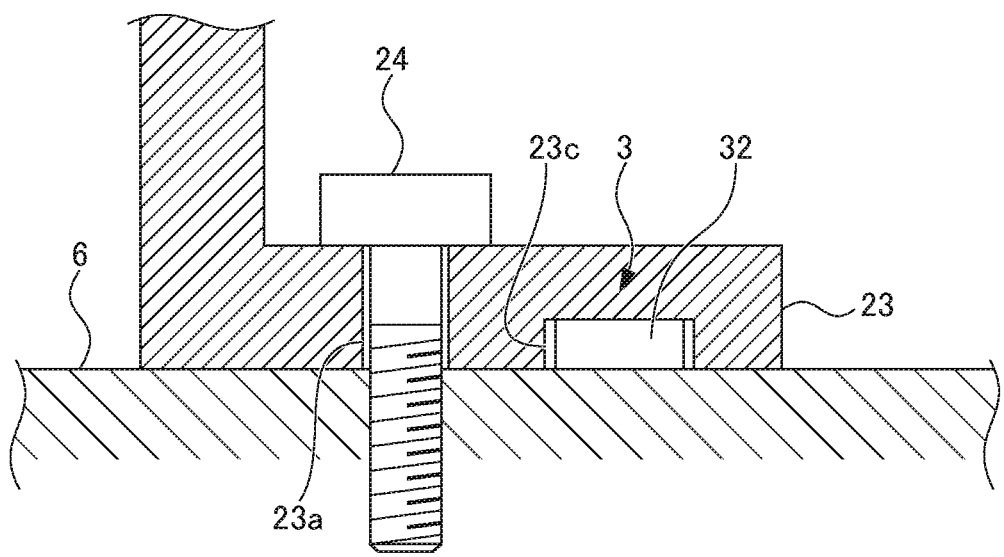
FIG. 4 is an enlarged cross-sectional view showing another example of the fixing portion in the motor shown in FIG. 1.

FIG. 4 is an enlarged cross-sectional view showing another example of the fixing portion in the motor shown in FIG. 1. Since the portions identified with the same reference numerals as in FIG. 2 are the portions of the same configurations, the description thereof will be omitted here by utilization of the above description. The looseness detection sensor 3 shown in FIG. 4 is formed with a pressure sensor 32 which indirectly detects the looseness of the bolt 24 in the fixing portion 23.

The pressure sensor 32 is attached to a concave portion 23c which is provided in the lower surface of the fixing portion 23. The concave portion 23c is arranged adjacent to the bolt 24. In a state where the fixing portion 23 is tightly and properly fixed to the fixing surface 6 by the fastening of the bolt 24, the pressure sensor 32 within the concave portion 23c is sandwiched, with a predetermined pressure (the axial force of the bolt 24), between the fixing portion 23 and the fixing surface 6 so as to be adhered thereto.

The pressure sensor 32 is formed such that the pressure sensor 32 detects a variation in the axial force of the bolt 24 so as to output a signal. Specifically, when the looseness of the bolt 24 occurs, the axial force of the bolt 24 is lowered, and thus the pressure detected by the pressure sensor 32 is lowered. The control unit 4 monitors an output value from the pressure sensor 32 constantly or at regular time intervals.

In the control unit 4 in this case, a threshold value for comparing the output value from the pressure sensor 32 is previously set. The threshold value is set to the output value output from the pressure sensor 32 when the looseness of the bolt 24 which causes a problem occurs. When the control unit 4 compares the output value from the pressure sensor 32 with the set threshold value, and detects that the output value reaches the threshold value or falls below the threshold value, the control unit 4 determines that the axial force of the bolt 24 is lowered and that thus the looseness of the bolt 24 occurs. When the control unit 4 determines that the looseness of the bolt 24 occurs, the control unit 4 outputs a signal to the notification unit 5 and simultaneously stops the driven rotation of the motor 2.

Even when the pressure sensor 32 described above is used as the looseness detection sensor 3, it is possible to obtain the same effects as when the microswitch 31 is used. Since the pressure sensor 32 detects a decrease in the axial force of the bolt 24, the pressure sensor 32 can also detect the slight looseness of the bolt 24 before the fixing portion 23 is floated up.

Figure 5:
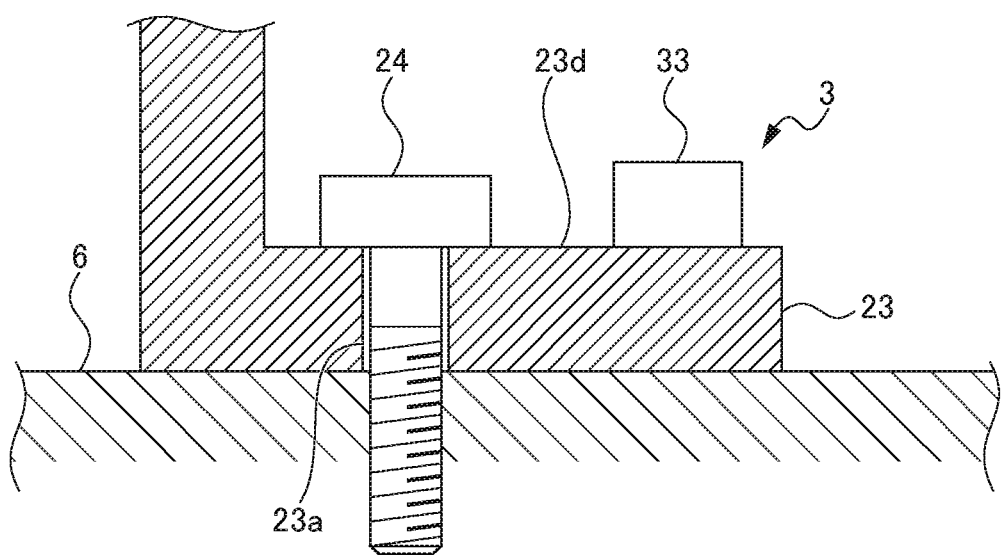
FIG. 5 is an enlarged cross-sectional view showing yet another example of the fixing portion in the motor shown in FIG. 1.

FIG. 5 is an enlarged cross-sectional view showing yet another example of the fixing portion in the motor shown in FIG. 1. Since the portions identified with the same reference numerals as in FIG. 2 are the portions of the same configurations, the description thereof will be omitted here by utilization of the above description. The looseness detection sensor 3 shown in FIG. 5 is formed with a vibration sensor 33 which indirectly detects the looseness of the bolt 24 in the fixing portion 23.

The vibration sensor 33 is attached to the upper surface 23*d* of the fixing portion 23 so as to be adjacent to the bolt 24. The vibration sensor 33 is formed such that the vibration sensor 33 detects that the fixing portion 23 vibrates with respect to the fixing surface 6 so as to output a signal. Specifically, when the looseness of the bolt 24 occurs, the adhesion force of the fixing portion 23 to the fixing surface 6 is lowered, and thus a slight vibration occurs in the fixing portion 23 by influence of repeated torque of the motor 2 or a vibration from the side of the machine. The control unit 4 monitors an output value from the vibration sensor 33 constantly or at regular time intervals.

Even in the control unit 4 in this case, a threshold value for comparing the output value output from the vibration sensor 33 is previously set. The threshold value is set to the output value output from the vibration sensor 33 when the looseness of the bolt 24 which causes a problem occurs. When the control unit 4 compares the output value from the vibration sensor 33 with the set threshold value, and detects that the output value reaches the threshold value or exceeds the threshold value, the control unit 4 determines that the fixing portion 23 vibrates and that thus the looseness of the bolt 24 occurs. When the control unit 4 determines that the looseness of the bolt 24 occurs, the control unit 4 outputs a signal to the notification unit 5 and simultaneously stops the driven rotation of the motor 2.

Even when the vibration sensor 33 described above is used as the looseness detection sensor 3, it is possible to obtain the same effects as when the microswitch 31 is used.

There is no limitation to the configuration in which the vibration sensor 33 is attached to the upper surface 23*d* of the fixing portion 23, and for example, the vibration sensor 33 may be attached within an unillustrated concave portion provided in the fixing portion 23.

Figure 6:
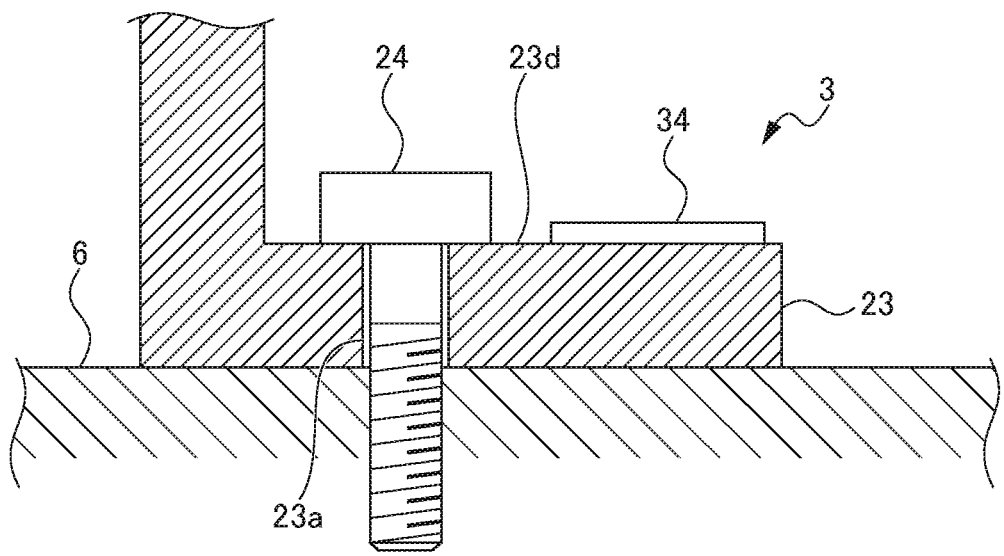
FIG. 6 is an enlarged cross-sectional view showing still another example of the fixing portion in the motor shown in FIG. 1.

FIG. 6 is an enlarged cross-sectional view showing still another example of the fixing portion in the motor shown in FIG. 1. Since the portions identified with the same reference numerals as in FIG. 2 are the portions of the same configurations, the description thereof will be omitted here by utilization of the above description. The looseness detection sensor 3 shown in FIG. 6 is formed with a strain gauge 34 which indirectly detects the looseness of the bolt 24 in the fixing portion 23.

The strain gauge 34 is attached to the upper surface 23*d* of the fixing portion 23 so as to be adjacent to the bolt 24. The strain gauge 34 is formed such that the strain gauge 34 detects a variation in the strain of the fixing portion 23 so as to output a signal. Specifically, when the looseness of the bolt 24 occurs, the axial force of the bolt 24 is lowered, and thus strain acting on the fixing portion 23 is reduced. The control unit 4 monitors an output value from the strain gauge 34 constantly or at regular time intervals.

Even in the control unit 4 in this case, a threshold value for comparing the output value output from the strain gauge 34 is previously set. The threshold value is set to the output value output from the strain gauge 34 when the looseness of the bolt 24 which causes a problem occurs. When the control unit 4 compares the output value from the vibration sensor 33 with the set threshold value, and detects that the output value reaches the threshold value or falls below the threshold value, the control unit 4 determines that the strain of the fixing portion 23 is reduced and that thus the looseness of the bolt 24 occurs. When the control unit 4 determines that the looseness of the bolt 24 occurs, the control unit 4 outputs a signal to the notification unit 5 and simultaneously stops the driven rotation of the motor 2.

Even when the strain gauge 34 described above is used as the looseness detection sensor 3, it is possible to obtain the same effects as when the microswitch 31 is used. Since the strain gauge 34 detects a decrease in the strain of the fixing portion 23 caused by a decrease in the axial force of the bolt 24, the strain gauge 34 can also detect the slight looseness of the bolt 24 before a large rattle is produced in the fixing portion 23.

There is no limitation to the configuration in which the strain gauge 34 is attached to the upper surface 23*d* of the fixing portion 23, and for example, the strain gauge 34 may be attached within an unillustrated concave portion provided in the fixing portion 23.

The looseness detection sensor 3 described above detects the looseness of the bolt 24 not directly but indirectly. Hence, the looseness detection sensor 3 described above can detect the looseness of the bolt 24 not only when the looseness occurs due to the rotation of the bolt 24 but also when the looseness occurs without the rotation of the bolt 24. Examples of the case where the looseness occurs without the rotation of the bolt 24 include a case where the bolt 24 is originally tightened insufficiently and a case where an unillustrated intervening member such as an antivibration rubber provided between the fixing portion 23 and the fixing surface 6 wears such that the looseness of the bolt 24 occurs.

Although when the control unit 4 described above detects the occurrence of looseness of the bolt 24, the control unit 4 immediately stops the driven rotation of the motor 2, the control unit 4 may not necessarily stop the driven rotation of the motor 2. For example, even when after the detection of the occurrence of looseness of the bolt 24, the control unit 4 makes the notification unit 5 provide a notification for a given time, if an input instruction indicating that for example, the further tightening or the replacement of the bolt 24 is completed is not provided from the operator through an unillustrated input unit or the like, the control unit 4 may perform control so as to automatically stop the driven rotation of the motor 2. When the control unit 4 detects the occurrence of looseness of the bolt 24, the control unit 4 may only make the notification unit 5 provide a notification and continue the driven rotation of the motor 2. In this case, the operator preferably stops the driven rotation of the motor 2 as necessary.

There is no limitation to the configuration in which only one looseness detection sensor 3 is provided in any one of a plurality of fixing portions 23 in the motor 2, and two or more looseness detection sensors 3 may be provided in one fixing portion 23. The looseness detection sensors 3 may be provided in two or more of the fixing portions 23 in the motor 2 or may be provided in all the looseness detection sensors 3 therein.

Figure 7:
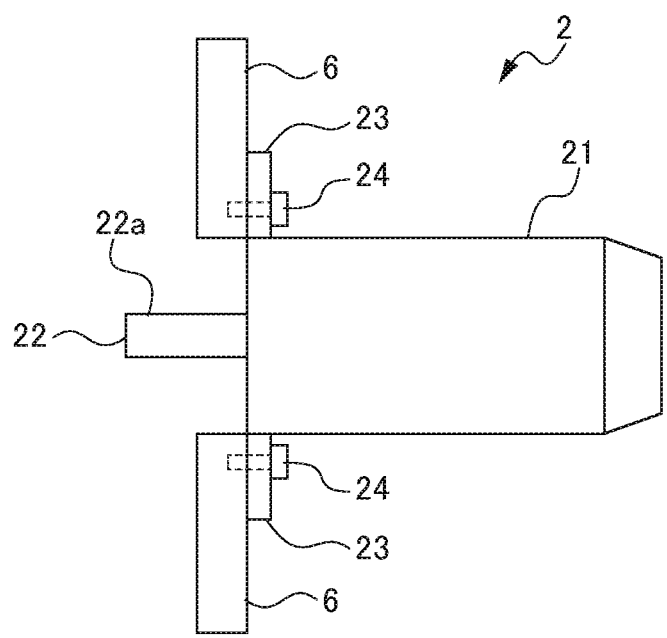
FIG. 7 is a diagram showing another example of the fixing portion in the motor.

Furthermore, there is no limitation to the configuration in which the fixing portion 23 of the motor 2 is formed with the foot portion described above, and as shown in FIG. 7, the fixing portion 23 may be formed with a flange portion which is provided so as to project laterally on the side of the output shaft in the motor 2.

The bolt 24 for attaching the motor 2 may be coated with an anti-loose agent as in a conventional configuration.

EXPLANATION OF REFERENCE NUMERALS

1 motor device
2 motor
23 fixing portion
24 bolt
3 looseness detection sensor
31 microswitch (looseness detection sensor)
32 pressure sensor (looseness detection sensor)
33 vibration sensor (looseness detection sensor)
34 strain gauge (looseness detection sensor)
4 control unit
6 fixing surface

What is claimed is:

1. A motor device comprising: a motor which includes a fixing portion for fixing to a fixing surface with a bolt;
   a looseness detection sensor which is provided in the fixing portion so as to be adjacent to at least one of the bolts, the looseness detection sensor indirectly detecting looseness of the bolt; and
   a control unit which determines occurrence of looseness of at least one of the bolts based on a signal output from the looseness detection sensor,
   wherein the looseness detection sensor is formed with a pressure sensor, the pressure sensor being sandwiched between the fixing portion and the fixing surface, and
   wherein the control unit detects decrease in pressure between the fixing portion and the fixing surface due to decrease in an axial force of the bolt, based on an output value from the pressure sensor.

2. A motor device comprising: a motor which includes a fixing portion for fixing to a fixing surface with a bolt;
   a looseness detection sensor which is provided in the fixing portion so as to be adjacent to at least one of the bolts, the looseness detection sensor indirectly detecting looseness of the bolt; and
   a control unit which determines occurrence of looseness of at least one of the bolts based on a signal output from the looseness detection sensor,
   wherein the looseness detection sensor is formed with a strain gauge, the strain gauge being attached to the fixing portion, and
   wherein the control unit detects reduction in strain of the fixing portion due to decrease in an axial force of the bolt, based on an output value from the strain gauge.

* * * * *